US008903582B2

(12) United States Patent
Mamiya et al.

(10) Patent No.: US 8,903,582 B2
(45) Date of Patent: Dec. 2, 2014

(54) METHOD AND DEVICE FOR CONTROLLING HYBRID AUTOMOBILE

(71) Applicant: Mazda Motor Corporation, Hiroshima (JP)

(72) Inventors: Kiyotaka Mamiya, Higashihiroshima (JP); Tadayoshi Kaide, Hiroshima (JP); Minji Sakaki, Aki-gun (JP); Taizo Shoya, Hiroshima (JP); Kanichi Yamaguchi, Hiroshima (JP); Tetsuya Tateishi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 149 days.

(21) Appl. No.: 13/766,704

(22) Filed: Feb. 13, 2013

(65) Prior Publication Data

US 2013/0231809 A1 Sep. 5, 2013

(30) Foreign Application Priority Data

Mar. 2, 2012 (JP) ................................. 2012-047070

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)
*B60W 20/00* (2006.01)
*B60W 10/06* (2006.01)
*B60W 10/08* (2006.01)

(52) U.S. Cl.
CPC .............. *B60W 20/20* (2013.01); *B60W 10/06* (2013.01); *B60W 10/08* (2013.01); *B60W 20/00* (2013.01); *B60W 20/1082* (2013.01); *B60W 20/10* (2013.01); *B60W 2600/00* (2013.01); *Y10S 903/903* (2013.01); *Y10S 903/93* (2013.01); *B60W 2710/0694* (2013.01); *B60Y 2300/474* (2013.01); *Y02T 10/6286* (2013.01); *Y10S 903/902* (2013.01); *Y10S 903/904* (2013.01); *Y10S 903/905* (2013.01)
USPC ................. 701/22; 701/36; 701/99; 701/101; 180/65.21; 180/65.265; 180/65.28; 903/902; 903/904; 903/905; 903/903; 903/930

(58) Field of Classification Search
USPC ............. 701/1, 22, 36, 69, 99, 101; 180/65.1, 180/65.21, 65.22, 65.225, 65.265, 65.27, 180/65.275, 65.28; 903/902, 904, 905
See application file for complete search history.

(56) References Cited

U.S. PATENT DOCUMENTS

| | | | | |
|---|---|---|---|---|
| 5,865,263 A * | 2/1999 | Yamaguchi et al. | ..... | 180/65.235 |
| 7,958,957 B2 * | 6/2011 | Suzuki et al. | ............ | 180/65.265 |
| 8,234,029 B2 * | 7/2012 | Ando | .............................. | 701/22 |

FOREIGN PATENT DOCUMENTS

JP    2004092428 A    3/2004

*Primary Examiner* — Rami Khatib
(74) *Attorney, Agent, or Firm* — Alleman Hall McCoy Russell & Tuttle LLP

(57) ABSTRACT

A method of controlling a hybrid automobile is provided. Only a drive force of the motor is outputted to wheels by stopping the engine while operating the motor when a required drive force is below a predetermined switch value, and at least a drive force of the engine is outputted to the wheels by operating at least the engine when the required drive force is above the switch value. The method includes estimating, when the required drive force is below the switch value, a switching possibility of the required drive force increasing above the switch value, operating the engine so that a temperature of a catalyst becomes a first temperature when the estimated switching possibility is above a predetermined level, and operating the engine so that the temperature of the catalyst becomes a second temperature lower than the first temperature when the estimated switching possibility is below the predetermined level.

20 Claims, 8 Drawing Sheets

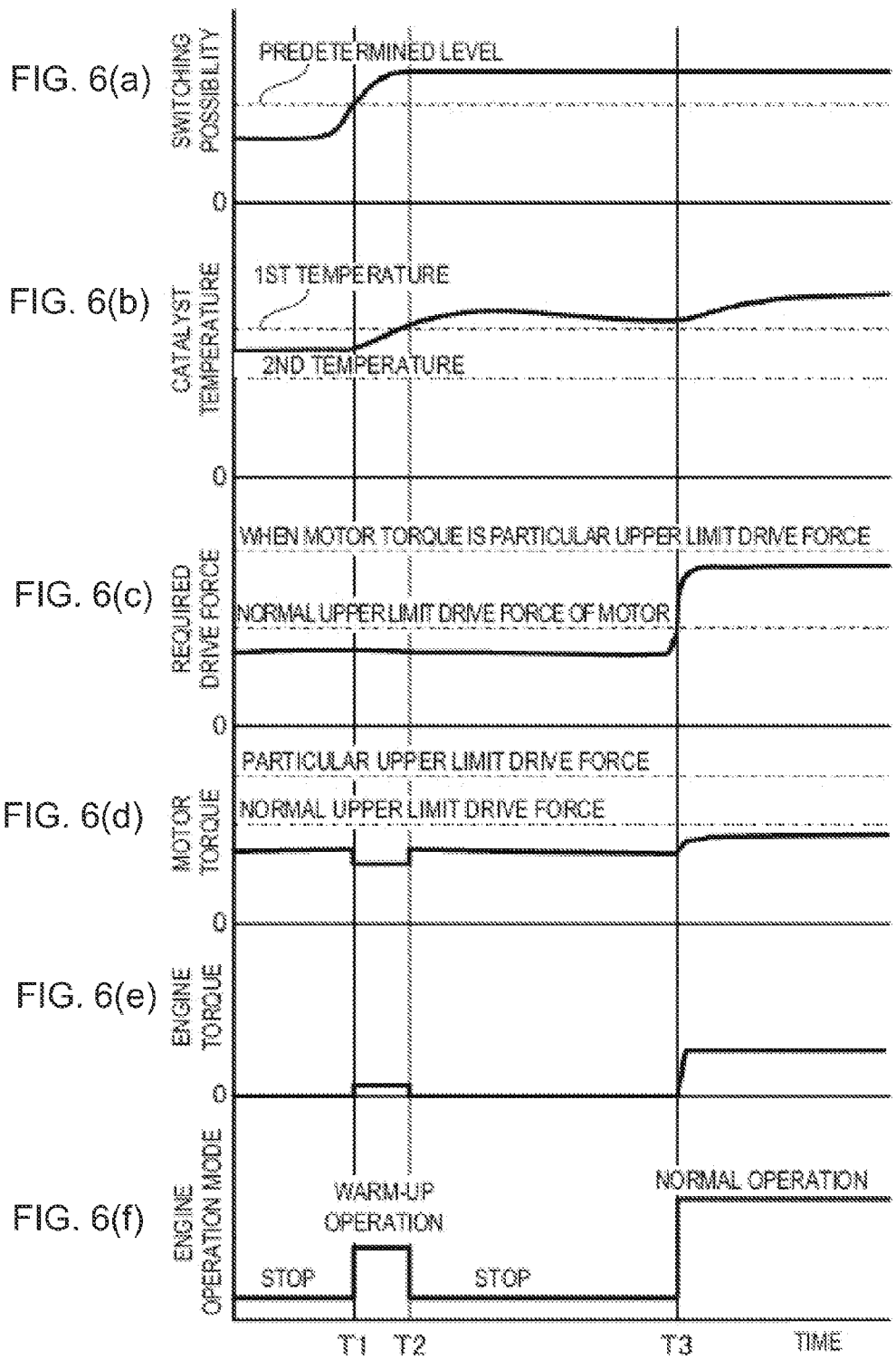

METHOD AND DEVICE FOR CONTROLLING HYBRID AUTOMOBILE

BACKGROUND

The present invention relates to a method and device for controlling a hybrid automobile in which only a drive force of a motor is outputted to wheels by stopping an engine but operating the motor when a required drive force is below a predetermined switch value, and on the other hand, a drive force of at least the engine is outputted to the wheels by operating at least the engine when the required drive force is above the predetermined switch value.

Recently, hybrid automobiles provided with engines and motors as drive sources of the vehicles have been disclosed. For example, JP2004-092428A discloses such a hybrid automobile in which a motor travel and an engine travel are switched therebetween according to a required drive force. In the motor travel, the engine is stopped but the vehicle travels only by a drive force of the motor, and in the engine travel, the engine is operated and the vehicle travels by a drive force of the engine (note that, the drive force of the motor may also be used).

Since engines of such hybrid automobiles are operated intermittently while traveling, emission performance may degrade. For example, JP2004-092428A also discloses an art for suppressing an emission degradation when a catalyst temperature is decreased during the motor travel and an activation of the catalyst is required to maintain an activated state of the catalyst in preparation of switching to the engine travel, by retarding an ignition timing of the engine to activate the catalyst rapidly while operating the engine in a no-load state by releasing clutches arranged on a drive path between the engine and drive wheels.

However, with the art disclosed in JP2004-092428A, as described above, when the activation of the catalyst is required during the motor travel, the ignition timing of the engine is retarded while operating the engine in the no-load state. Therefore, the required drive force does not increase. When the motor travel continues, even though there is no risk of emission degradation, a consumption amount of fuel increases unnecessarily, causing a problem of fuel consumption degradation.

SUMMARY

The present invention is made in view of the above situations and suppresses degradation in emission and fuel consumption.

To solve the above described problems, according to the present invention, when a required drive force is below a switch value, a switching possibility that the required drive force will increase above the switch value is estimated, and a target temperature of a catalyst is set based on the estimated switching possibility.

According to one aspect of the invention, a method of controlling a hybrid automobile is provided. The hybrid automobile includes a motor and an engine for outputting drive forces to wheels, and a catalyst arranged in an exhaust passage of the engine. Only a drive force of the motor is outputted to the wheels by stopping the engine while operating the motor when a required drive force is below a predetermined switch value, and on the other hand, at least a drive force of the engine is outputted to the wheels by operating at least the engine when the required drive force is above the switch value.

The method includes estimating, when the required drive force is below the switch value, a switching possibility that the required drive force will increases above the switch value. The method includes operating the engine so that a temperature of the catalyst becomes a first temperature when the estimated switching possibility is above a predetermined level. The method includes operating the engine so that the temperature of the catalyst becomes a second temperature lower than the first temperature when the estimated switching possibility is below the predetermined level.

According to this, when the required drive force is below the switch value, the switching possibility that the required drive force will increase above the switch value is estimated. When the estimated switching possibility is above the predetermined level, in other words, when the switching possibility is relatively high, the engine is operated so that the temperature of the catalyst becomes the first temperature which is relatively high, and therefore, when the required drive force increases above the switch value and the engine is started, the emission degradation can be suppressed. On the other hand, when the estimated switching possibility is below the predetermined level, in other words, when the switching possibility is relatively low, the engine is operated so that the temperature of the catalyst becomes the second temperature which is relatively low, and therefore, a frequency of operating the engine to maintain the activated state of the catalyst can be reduced. Thus, the unnecessary increase in consumption amount of the fuel and the fuel consumption degradation can be suppressed.

The first temperature may be set higher than an activating temperature of the catalyst.

According to this, the first temperature is set higher than the activating temperature of the catalyst. Therefore, when the estimated switching possibility is above the predetermined level, in other words, when the switching possibility is relatively high, the engine is operated so that the temperature of the catalyst becomes higher than the activating temperature of the catalyst. Thus, the emission degradation when the required drive force increases above the switch value and the engine is started can further be suppressed.

The second temperature may be set lower than the activating temperature of the catalyst.

According to this, the second temperature is set lower than the activating temperature of the catalyst. Therefore, when the estimated switching possibility is below the predetermined level, in other words, when the switching possibility is relatively low, the engine is operated so that the temperature of the catalyst becomes lower than the activating temperature of the catalyst. Thus, the unnecessary increase in consumption amount of the fuel and the fuel consumption degradation can further be suppressed.

The second temperature may be set lower as the estimated switching possibility is lower.

According to this, the second temperature is set lower as the estimated switching possibility is lower. Therefore, in a case where the estimated switching possibility is below the predetermined level, the engine is operated so that the temperature of the catalyst becomes relatively high when the switching possibility is relatively high, and on the other hand, the engine is operated so that temperature of the catalyst becomes relatively low when the switching possibility is relatively low. Thus, the degradation in the emission and fuel consumption can further be suppressed.

The switch value may correspond to a normal upper limit drive force of the motor, and the method may further include, when the estimated switching possibility is below the predetermined level and the required drive force exceeds the normal upper limit drive force, operating the engine in an activation facilitating mode where an activation of the catalyst is able to be facilitated, and operating the motor in a high output mode where the drive force is higher than the normal upper limit drive force.

According to this, when the estimated switching possibility is below the predetermined level and the required drive force exceeds the normal upper limit drive force of the motor, the engine is operated in the activation facilitating mode where the activation of the catalyst can be facilitated, and the motor is operated in the high output mode where the drive force is higher than the normal upper limit drive force. Therefore, when the temperature of the catalyst is still below the activating temperature and the engine is operated, the required drive force can be satisfied by the drive force of the motor and the catalyst can be activated rapidly. Here, the engine can be operated at a low load and, thus, it is advantageous in suppressing the emission degradation and rapidly warming up the engine.

Here, various kinds of well-known methods may be adopted to operate the engine in "the activation facilitating mode where the activation of the catalyst can be facilitated." Specific examples include, when the engine is a spark-ignition engine, an operation of increasing an exhaust gas temperature by retarding an ignition timing of the engine, and when the engine is a compression ignition engine, an operation of increasing the exhaust gas temperature by retarding a combustion timing through a method of, for example, retarding an injection timing of the engine.

A lower limit value of the second temperature may be set such that when the temperature of the catalyst is at the lower limit second temperature, the temperature of the catalyst becomes an activating temperature by operating the engine in the activation facilitating mode and the motor in the high output mode.

According to this, the lower limit second temperature is set such that when the temperature of the catalyst is at the lower limit second temperature, the engine is operated in the activation facilitating mode and the motor is operated in the high output mode to bring the temperature of the catalyst to the activating temperature. Thus, when the required drive force increased above the switch value and the engine is started, the emission degradation can further be suppressed.

The lower limit second temperature may be set lower as a temperature of the motor is lower when a vehicle power source is switched from an OFF state to an ON state.

According to this, the lower limit second temperature is set lower as the temperature of the motor is lower, in other words, the performance (i.e., instantaneous output) of the motor is higher when the vehicle power source is switched from the OFF state to the ON state. Thus, the lower limit second temperature can be a temperature suitable for the performance of the motor.

The method may further include operating the engine so that the temperature of the catalyst becomes the lower limit second temperature when the vehicle power source is switched from the OFF state to the ON state.

According to this, the engine is operated so that the temperature of the catalyst becomes the lower limit second temperature when the vehicle power source is switched from the OFF state to the ON state, the lower limit second temperature being a temperature from which the temperature of the catalyst becomes the activating temperature by operating the engine in the activation facilitating mode and the motor in the high output mode. Thus, the emission degradation can be suppressed when the hybrid automobile is started and the engine is started because the required drive force is increased above the switch value.

According to another aspect of the invention, a control device of a hybrid automobile is provided. The device includes a motor and an engine for outputting drive forces to wheels, a catalyst arranged in an exhaust passage of the engine, and a controller for outputting only a drive force of the motor to the wheels by stopping the engine while operating the motor when a required drive force is below a predetermined switch value, and on the other hand, outputting at least a drive force of the engine to the wheels by operating at least the engine when the required drive force is above the switch value.

The controller estimates, when the required drive force is below the switch value, a switching possibility that the required drive force will increase above the switch value, and the controller operates the engine so that a temperature of the catalyst becomes a first temperature when the estimated switch possibility is above a predetermined level, and on the other hand, the controller operates the engine so that the temperature of the catalyst becomes a second temperature lower than the first temperature when the estimated switch possibility is below the predetermined level.

According to this, the similar effects to the above aspect can be obtained.

BRIEF DESCRIPTION OF THE DRAWINGS

FIGS. 6(a)-6(f) illustrate charts showing one example of changes regarding an activation of a catalyst, in which (a) is the change of a switching possibility, (b) is the change of a catalyst temperature, (c) is the change of a required drive force, (d) is the change of the motor torque, (e) is the change of an engine torque, and (f) is the change of an engine operation mode.

DETAILED DESCRIPTION OF THE EMBODIMENTS

Hereinafter, suitable embodiments of a control device of a hybrid automobile according to the present invention are described in detail with reference to the appended drawings. Note that, the following descriptions of the suitable embodiments are illustrations.

First Embodiment

Figure 1:
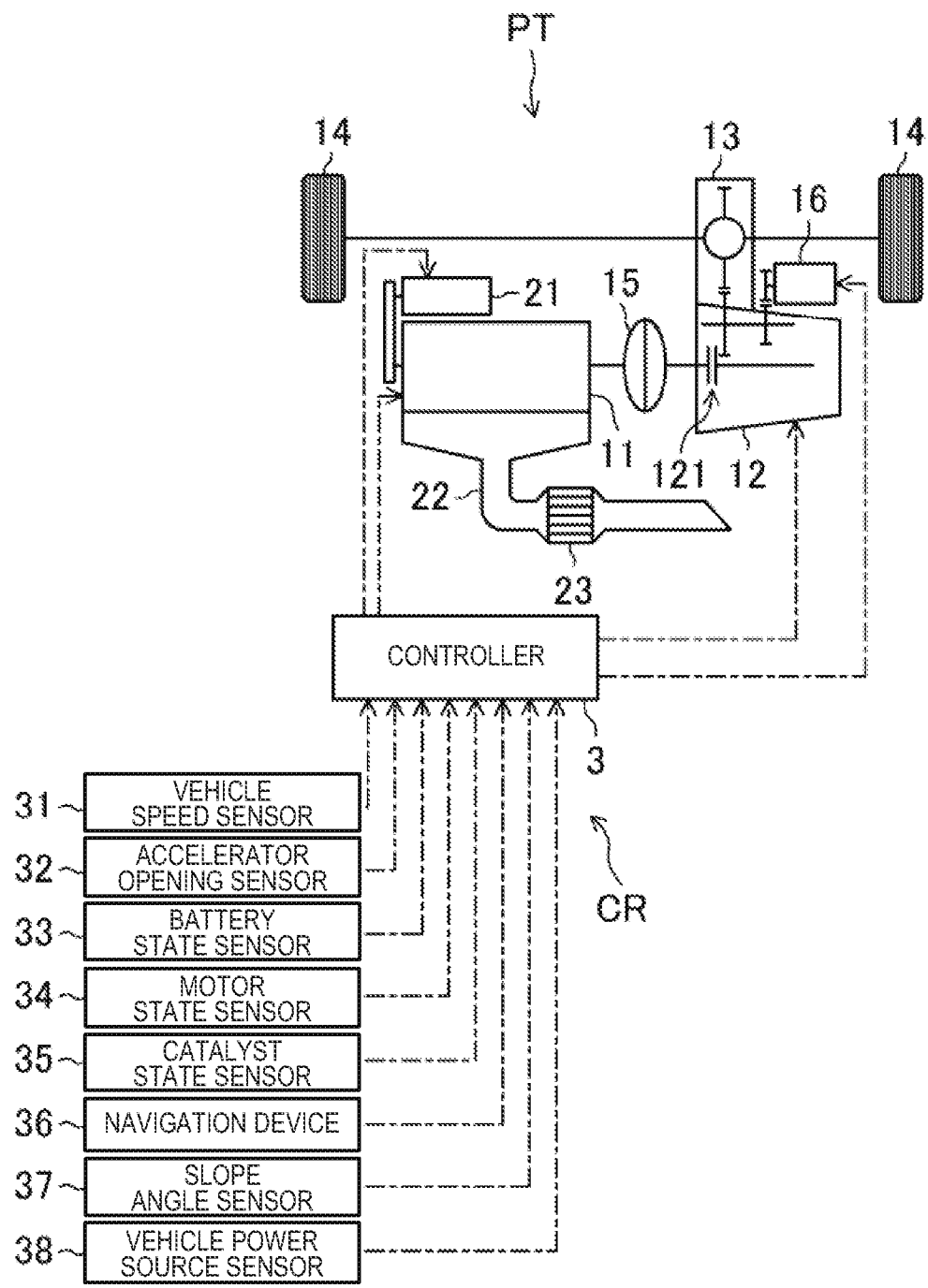
FIG. 1 is an overall block diagram of a powertrain and a control device of a vehicle.

FIG. 1 is an overall block diagram of a powertrain and a control device of the vehicle. The powertrain PT includes an engine 11, a gear transmission 12, a differential gear 13, left and right drive wheels 14, a torque convertor 15, and an electric motor 16. The engine 11 generates a drive force. The gear transmission 12 is coupled to the engine 11 and shifts gears. The differential gear 13 receives an output from the gear transmission 12 and distributes a drive force to left and right directions of the vehicle. The left and right drive wheels 14 (e.g., front wheels) receive the drive force from the differential gear 13. The torque convertor 15 (hydraulic electric device) is arranged between the engine 11 and the gear transmission 12. The electric motor 16 is arranged downstream of the gear transmission 12 in a drive force transmitting direction and drives the drive wheels 14 via the differential gear 13. The hybrid automobile is a so called parallel hybrid automobile including the engine 11 and the electric motor 16 as its drive sources and, as described later, travels while switching a traveling mode between a motor traveling mode (hereinafter, referred to as the EV traveling mode) in which the electric motor 16 is operated but the engine 11 is stopped, and an engine traveling mode in which at least the engine 11 is operated, according to a required drive force which is set based on a vehicle speed and an accelerator opening. Here, the engine traveling mode has at least three states: a combination traveling state where the engine 11 and the electric motor 16 are both operated and the drive forces obtained therefrom are outputted to the drive wheels 14; an engine traveling state where only the drive force of the engine 11 is outputted to the wheels; and a state where the electric motor 16 functions as a power generator.

Although the detailed illustration is omitted, the engine 11 is a four-cycle spark-ignition engine. The engine 11 includes a power generator coupled to a crankshaft via a belt, and in this embodiment, the power generator is a BISG (Belt-Integrated Starter Generator) 21 where a starter and the power generator are integrated. An exhaust passage 22 is connected on an exhaust side of the engine 11 and, for example, a three-way catalyst 23 (hereinafter, simply referred to as "the catalyst 23") for purifying exhaust gas is arranged in the exhaust passage 22.

Although the detailed illustration is omitted, the gear transmission 12 is configured as a multistage automatic transmission including therein for example, a planetary gear mechanism and friction coupling elements for selectively restricting a rotation of each rotational element of the planetary gear mechanism, the friction coupling elements being a plurality of clutch elements and brake element. The gear transmission 12 achieves each shift level by coupling at least two of the plurality of elements. Specifically, the gear transmission 12 is switched between a drive state where a predetermined shift level is achieved by coupling at least two of the elements, and a neutral state where a torque transmission between the engine 11 and the drive wheels 14 is cut off by not coupling any of the elements. Therefore, particularly with the hybrid automobile of this embodiment, as described later, the gear transmission 12 functions as a connector/disconnector 121 for connecting and disconnecting the torque transmission between the engine 11 and the drive wheels 14 by switching release and coupling of each of the clutch elements and brake elements therebetween. The connector/disconnector 121 is effective in avoiding a dragging phenomenon in which the engine 11 rotates while being dragged interlockingly with the vehicle travel.

The electric motor 16 is, for example, a three-phase alternating-current synchronous motor and is driven by a drive current which is supplied via a battery and an inverter (not illustrated). Here, the EV traveling mode has three states: a state where the vehicle travels only by the drive force of the electric motor 16; a state where the vehicle travels while regenerating the electric motor 16; and a state where the vehicle travels only by inertia without any operation of the electric motor 16.

A control device CR of the vehicle controls the operation of the engine 11 (including a start control of the engine 11 through the BISG 21), the operation of the electric motor 16 (including powering and regeneration of the electric motor) through the control of the inverter, and the shift level of the gear transmission 12, etc. The control device CR includes a controller 3 and various sensors 31 to 38 (including a navigation device 36) for detecting various states including the traveling mode of the vehicle, and providing them to the controller 3. Among the controller and the sensors, the controller 3 is, for example, a general micro computer and includes at least a CPU, a ROM, a RAM, an I/O interface circuit, and a data bus (not illustrated).

The various sensors at least include a vehicle speed sensor 31, an accelerator opening sensor 32, a battery state sensor 33, a motor state sensor 34, a catalyst state sensor 35, the navigation device 36, a slope angle sensor 37, and a vehicle power source sensor 38. The vehicle speed sensor 31 provides to the controller 3 information regarding a traveling speed of the vehicle. The accelerator opening sensor 32 provides to the controller 3 information regarding the accelerator opening corresponding to a depression amount of an accelerator. The battery state sensor 33 provides to the controller 3 information regarding various states of the battery including information on a SOC (State of Charge) of the battery and a battery temperature. The motor state sensor 34 provides to the controller 3 information regarding the state of the electric motor 16, such as, temperature information of the electric motor 16. The catalyst state sensor 35 provides to the controller 3 information regarding purification efficiency of the catalyst 23, such as, temperature information of the catalyst 23. The navigation device 36 provides to the controller 3 information regarding a path to a destination. The slope angle sensor 37 provides to the controller 3 information regarding a slope angle of a road surface. The vehicle power source sensor 38 provides to the controller 3 information regarding a state of a vehicle power source (not illustrated), such as, an ON/OFF state of the vehicle power source. The controller 3 receives the sensor signals from the sensors 31 to 38 to perform operational processing, and controls the engine 11, the BISG 21, the gear transmission 12, and the electric motor 16.

Note that, although the catalyst state sensor 35 is provided in this embodiment, it may alternatively be such that the temperature or purification efficiency of the catalyst is estimated based on, for example, history information of the engine water temperature and the operation state of the vehicle (engine).

Specifically, the controller 3 switches the states of the electric motor 16 and the engine 11 between under operation and stopped (started and stopped) so as to switch the modes between the EV traveling mode and the engine traveling mode according to the required drive force which is set based on the vehicle speed and the accelerator opening. Moreover, the controller 3 performs the control of the gear transmission 12 according to the switch of the traveling mode, such as, a gear shift control according to a shift map and the connecting/disconnecting switch of the torque between the engine 11 and the drive wheels 14 by the connector/disconnector 121.

Figure 2:
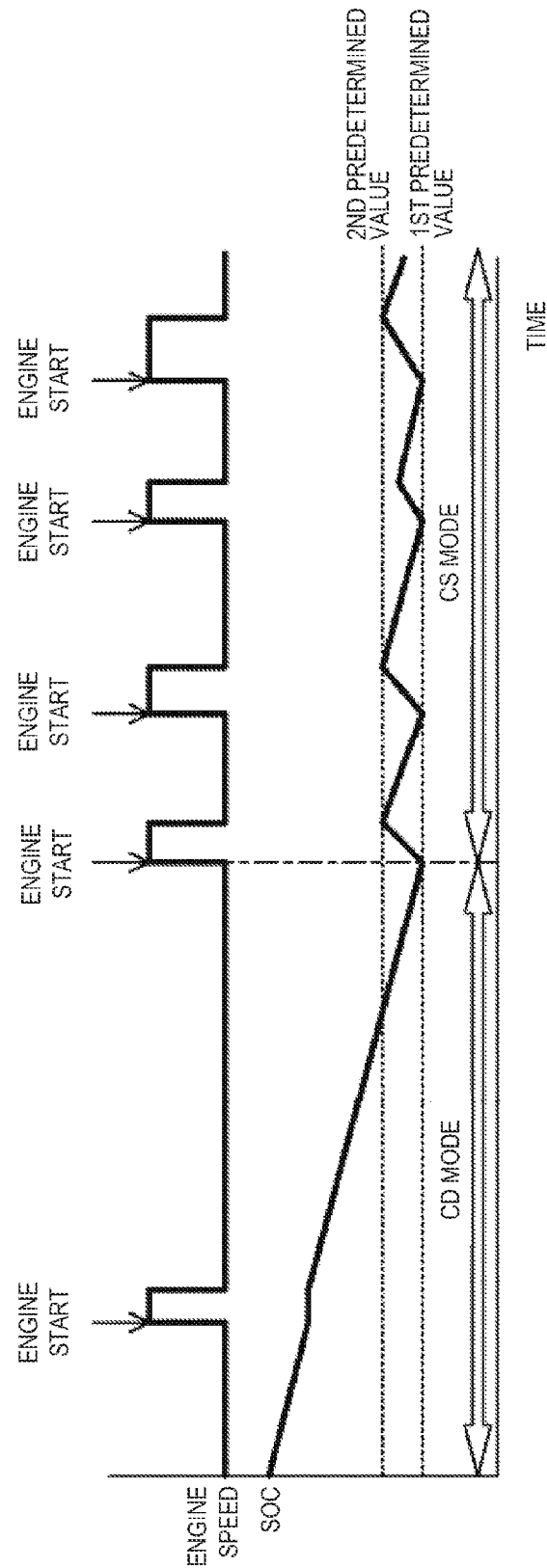
FIG. 2 is a chart showing one example of a change of an engine speed and a change of an SOC of a battery in a CD mode and a CS mode.

In this embodiment, although the detailed illustration is omitted, the hybrid automobile is a plug-in hybrid automobile of which the battery can be charged by external power feeding, and switches between a CD mode (which may be referred to as "the battery-using travel" or "the plug-in travel") and a CS mode (which may be referred to as "the charged power maintaining travel" or "the hybrid travel") according to the SOC of the battery (see FIG. 2). Specifically, when the SOC of the battery is above a first predetermined value, the operation mode of the hybrid automobile is the CD mode (left side in FIG. 2), in which basically the motor travel is performed, and the operation of the engine is suppressed. For example, when the hybrid automobile is started after the battery charge is completed by the external power feeding, the operation mode is the CD mode while the SOC decreases to the first predetermined value. In the CD mode, because the battery charge by the operation of the engine 11 is restricted while allowing a power consumption of the battery, the SOC gradually decreases. Thus, when the SOC falls below the first predetermined value, the operation mode is switched to the CS mode in which the battery is charged by frequently starting to operate the engine 11 according to the SOC so that the SOC is kept between the first predetermined value and a second predetermined value which is higher than the first predetermined value by a predetermined value.

Figure 3:
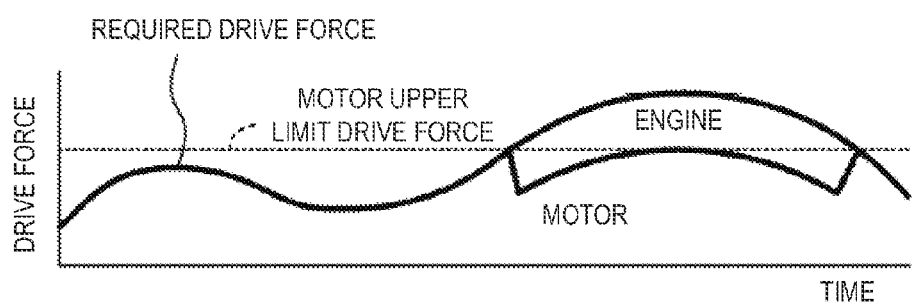
FIG. 3 is a chart showing one example of a distribution of a required drive force between a drive force of a motor and a drive force of an engine in the CD mode.
Figure 4:
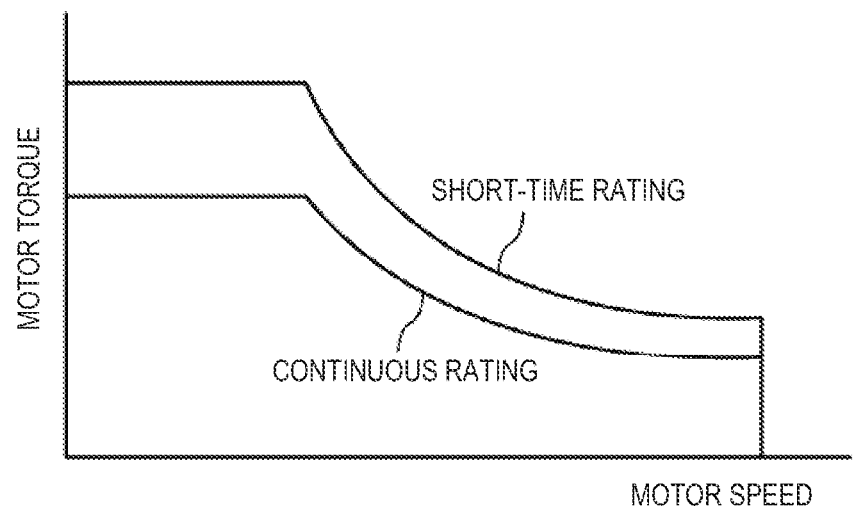
FIG. 4 is a chart showing a relation between a motor torque and a motor speed at a continuous rating and a short-time rating of the motor, respectively.

As described above, in the CD mode, the power consumption of the battery is prioritized and the operation of the engine 11 is suppressed, but for example, when the required drive force is increased above a predetermined value, the required drive force cannot be satisfied only by the electric motor 16, and therefore, as shown in FIG. 2, the engine 11 is started to use the drive force of the engine in a supplemental manner. FIG. 3 shows one example of a distribution of the required drive force between the drive force of the electric motor 16 and the drive force of the engine 11 in the CD mode. In the CD mode, a normal upper limit drive force of the electric motor 16 is set in advance, and when the required drive force is below the normal upper limit drive force, the electric motor 16 is operated while the engine 11 is stopped so as to satisfy the required drive force only by the drive force of the electric motor 16. Here, the normal upper limit drive force of the electric motor 16 may be set with reference to a continuous rating of the electric motor 16 (see FIG. 4). For example, the normal upper limit drive force may be matched with the continuous rating. In the CD mode, the normal upper drive force corresponds to a switch value at which the EV traveling mode and the engine traveling mode are switched therebetween for the required drive force. On the other hand, when the required drive force exceeds the normal upper limit drive force of the electric motor 16, the engine 11 is also operated, and the required drive force is satisfied by both the drive forces of the electric motor 16 and the engine 11.

As described above, in CD mode, the operation of the engine 11 is suppressed and, therefore, it is hardly operated; however, the engine 11 is required to be operated when the required drive force exceeds the switch value. Here, if the catalyst 23 is not activated, emission performance degrades. Therefore, even in the CD mode, the catalyst 23 needs to be maintained in a predetermined activated state. However, although the activation of the catalyst 23 requires operating the engine 11 intermittently regardless of the value of the required drive force, if the catalyst 23 is to be activated by operating the engine 11 based only on the activated state of the catalyst 23 in the EV traveling mode, the required drive force does not increase. Further, when the EV traveling mode continues, even though there is no risk of emission degradation, a consumption amount of fuel increases unnecessarily, causing fuel consumption degradation.

Thus, with this hybrid automobile, when the required drive force is below the switch value, a possibility is estimated that the required drive force will eventually increase above the switch value which causes the traveling mode change (switching possibility), and a target temperature of the catalyst 23 is set based on the estimated switching possibility.

Figure 5:
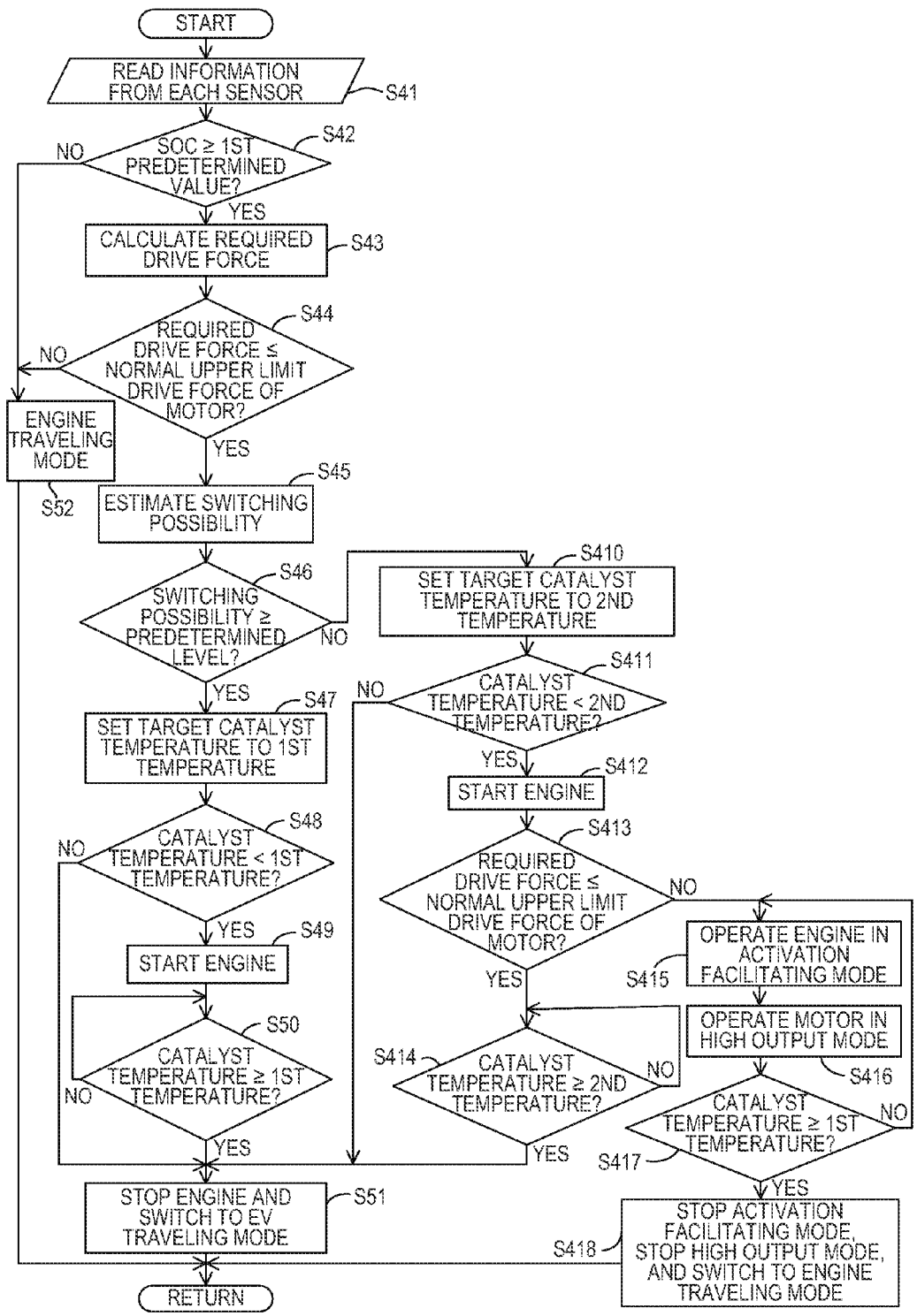
FIG. 5 is a flowchart relating to a control of the engine and the motor performed by a controller while the vehicle travels.

FIG. 5 is a flowchart relating to a control of the engine 11 and the motor 16 performed by the control device CR. First, at Step S41 after the control starts, the controller 3 reads the information from the sensors 31 to 38. At the following Step S42, it is determined whether the SOC of the battery is above the first predetermined value. If the result of the determination at Step S42 is YES, the control shifts to Step S43 and the operation mode is set to the CD mode. On the other hand, if the result of the determination at Step S42 is NO, the control shifts to Step S52 and the operation mode is set to the CS mode.

At Step S43, the required drive force is calculated based on the vehicle speed and the accelerator opening. At the following Step S44, it is determined whether the required drive force which is set based on the accelerator opening and the vehicle speed is below the normal upper limit drive force of the electric motor 16. If the result of the determination at Step S44 is YES, the control shifts to Step S45. On the other hand, if the result of the determination at Step S44 is NO, the control shifts to Step S52.

At Step S45, the switching possibility that the required drive force will eventually exceed the normal upper limit drive force of the electric motor 16 is estimated based on the accelerator opening, the slope of the road surface, and the navigation information. The switching possibility is estimated to be high when there is an acceleration request or an uphill road exists on the path to the destination, for example. At the following Step S46, it is determined whether the switching possibility is above a predetermined level. The predetermined level is set in advance as a threshold for determining whether the switching possibility is high. If the result of the determination at Step S46 is YES, in other words, when the switching possibility is relatively high, the control shifts to Step S47. On the other hand, if the result of the determination at Step S46 is NO, in other words, when the switching possibility is relatively low, the control shifts to Step S410.

At Step S47, the target temperature of the catalyst 23 is set to a first temperature. The first temperature is set in advance to be higher than the activating temperature of the catalyst 23, and may suitably be set, for example, to around 250° C. At the following Step S48, it is determined whether the catalyst temperature is below the set first temperature. If the result of the determination at Step S48 is YES, the control shifts to Step S49. On the other hand, if the result of the determination at Step S48 is NO, the control shifts to Step S51.

At Step S49, the engine 11 is started. At the following Step S50, it is determined whether the catalyst temperature is above the first temperature. If the result of the determination at Step S50 is YES, in other words, when the activation of the catalyst 23 is completed, the control shifts to Step S51. On the hand, if the result of the determination at Step 50 is NO, in other words, when the activation is not completed, the control returns back to Step S50.

At Step S51 when the activation of the catalyst 23 is completed, the engine 11 is stopped and the traveling mode is switched to the EV traveling mode.

At Step S52, the traveling mode is switched, on the other hand, to the engine traveling mode.

Moreover, at Step S410, the target temperature of the catalyst 23 is set to a second temperature. The second temperature is set lower than the activating temperature of the catalyst 23, in other words, lower than the first temperature, and may be set lower as the switching possibility is lower. A lower limit value of the second temperature is set in advance, and may suitably be set, for example, to a room temperature. At the following Step S411, it is determined whether the catalyst temperature is below the set second temperature. If the result of the determination at Step S411 is YES, the control shifts to Step S412. On the other hand, if the result of the determination at Step S411 is NO, the control shifts to Step S51.

At Step S412, the engine 11 is started. At the following Step S413, it is determined whether the required drive force is below the normal upper limit drive force of the electric motor 16. If the result of the determination at Step S413 is YES, the control shifts to Step S414. On the other hand, if the result of the determination at Step S413 is NO, in other words, when the required drive force exceeds the normal upper limit drive force of the electric motor 16, the control shifts to Step S415.

At Step S414, it is determined whether the catalyst temperature is above the second temperature. If the result of the determination at Step S414 is YES, the control shifts to Step S51. On the other hand, if the result of the determination at Step S414 is NO, the control returns back to Step S414.

On the other hand, at Step S415, the engine 11 is operated at a low load (including no load) and an ignition timing of the engine is significantly retarded. Such an operation mode of the engine 11 increases an exhaust gas temperature and facilitates the activation of the catalyst 23 (i.e., the activation facilitating mode). At the following Step S416, the electric motor 16 is started (operated) and the drive force is temporarily increased to be higher than the normal upper limit drive force (i.e., high output mode). In the high output mode, a particular upper limit drive force of the electric motor 16 which is higher than the normal upper limit drive force is set in advance, and when the switching possibility is below the predetermined level and the required drive force exceeds the normal upper limit drive force of the electric motor 16, the electric motor 16 is operated in the high output mode and the engine 11 is operated in the activation facilitating mode. Thus, the required drive force is satisfied by both the drive forces of the electric motor 16 and the engine 11. Here, the particular upper limit drive force of the electric motor 16 may be set with reference to a short-time rating of the electric motor 16 (e.g., a 30-second rating or a 3-second rating, see FIG. 4). For example, the particular upper limit drive force of the electric motor 16 may be matched with the short-time rating of the electric motor 16.

At the following Step S417, it is determined whether the catalyst temperature is above the first temperature. If the result of the determination at Step S417 is YES, in other words, when the activation of the catalyst 23 is completed, the control shifts to Step S418. On the other hand, if the result of the determination at Step S417 is NO, in other words, when the activation is not completed, the control returns back to Step S415.

At Step S418, the operation of the engine 11 in the activation facilitating mode and the operation of the electric motor 16 in the high output mode are stopped, and the traveling mode is switched to the engine traveling mode.

Next, with reference to FIGS. 6(a)-6(f) and 7(a)-7(f), the above described control of the engine 11 and the electric motor 16 in the CD mode is described in further detail. First, FIGS. 6(a)-6(f) illustrate one example of starting the engine 11 to start the activation of the catalyst 23 due to the switching possibility, which the required drive force will exceed the normal upper limit drive force of the electric motor 16, becoming higher than the predetermined level. Specifically, as shown in FIG. 6(a), when the switching possibility gradually increases and exceeds the predetermined level at a timing T1, the engine 11 is started to operate in a warm-up operation mode with a low load and a significantly retarded ignition timing. In the example illustrated in FIG. 6, the required drive force is not satisfied by the drive force of the engine 11 and, therefore, the electric motor 16 is operated during the warm-up operation mode (see FIG. 6(d)). In this manner, as shown in FIG. 6(b), the temperature of the catalyst 23 gradually increases.

Thus, as shown in FIG. 6(b), when the temperature of the catalyst 23 exceeds the first temperature at the timing T2, the activation of the catalyst 23 is considered to be completed, and the engine 11 is stopped but the electric motor 16 is operated to satisfy the required drive force. In other words, the traveling mode returns to the EV traveling mode (see FIGS. 6(d) to (f)).

Moreover, as shown in FIG. 6(c), when the required drive force exceeds the normal upper limit drive force of the electric motor 16 at a timing T3, the engine 11 is started in a normal operation mode to satisfy the required drive force. In other words, the traveling mode is switched to the engine traveling mode (see FIG. 6(d) to (f)).

Figure 7A:
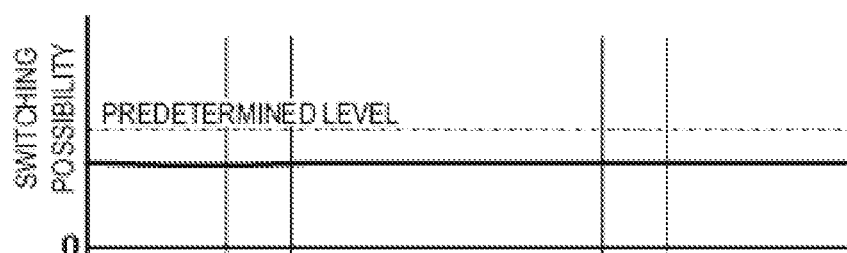
FIGS. 7(a)-7(f) illustrate charts showing one example of the changes different from FIGS. 6(a)-6(f), regarding the activation of the catalyst, in which (a) is the change of the switching possibility, (b) is the change of the catalyst temperature, (c) is the change of the required drive force, (d) is the change of the motor torque, (e) is the change of the engine torque, and (f) is the change of the engine operation mode.
Figure 7B:
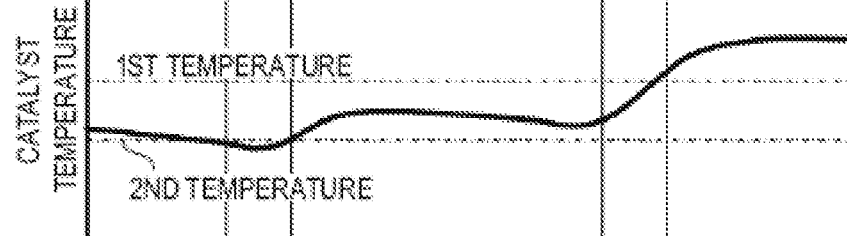

FIGS. 7(a)-7(f) illustrate one example of starting the engine 11 to start the activation of the catalyst 23 due to the required drive force exceeding the normal upper limit drive force of the electric motor 16 when the switching possibility is below the predetermined level. Specifically, as shown in FIG. 7(b), when the temperature of the catalyst 23 gradually decreases to below the second temperature at the timing T1, the engine 11 is started to operate in the warm-up operation mode with the low load and the significantly retarded ignition timing. In the example illustrated in FIG. 7, the required drive force is not satisfied by the drive force of the engine 11 and, therefore, the electric motor 16 is operated during the warm-up operation mode (see FIG. 7(d)). In this manner, as shown in FIG. 7(b), the temperature of the catalyst 23 gradually increases.

Thus, as shown in FIG. 7(b), when the temperature of the catalyst 23 exceeds the second temperature at the timing T2, the engine 11 is stopped but the electric motor 16 is operated to satisfy the required drive force. In other words, the traveling mode returns to the EV traveling mode (see FIG. 7(d) to (f)).

Figure 7C:
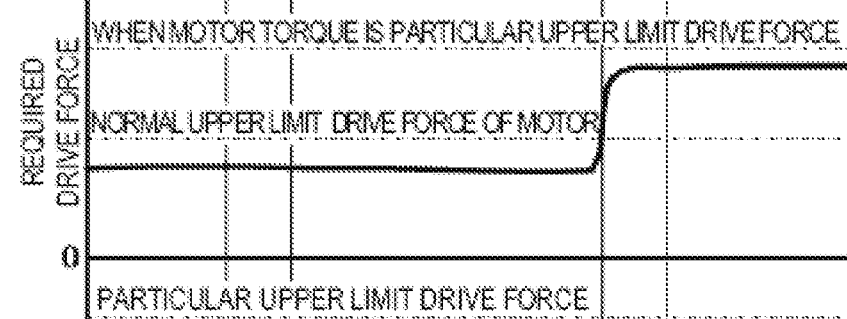
Figure 7D:
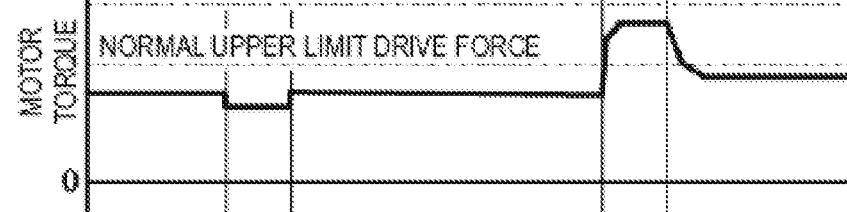
Figure 7E:
Figure 7F:
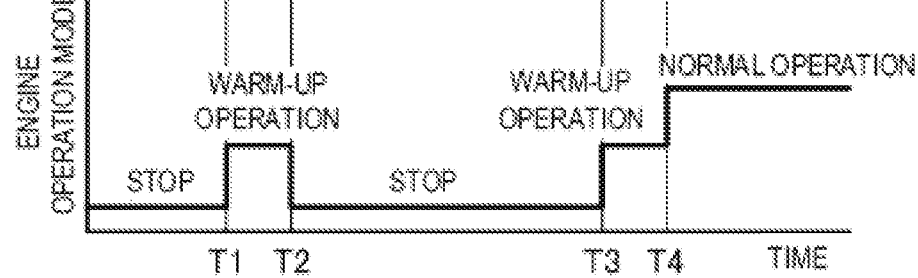

Then, as shown in FIG. 7(c), when the required drive force exceeds the normal upper limit drive force of the electric motor 16 at the timing T3, the engine 11 is started to operate in the warm-up operation mode with the low load and the significantly retarded ignition timing (i.e., the activation facilitating mode), and the electric motor 16 is operated in the high output mode in which the drive force is higher than the normal upper limit drive force so as to satisfy the required drive force (see FIG. 7(d) to (f)).

Moreover, as shown in FIG. 7(c), when the temperature of the catalyst 23 exceeds the first temperature at a timing T4, the operation of the engine 11 in the activation facilitating mode and the operation of the electric motor 16 in the high output mode are stopped, but instead, the engine 11 is operated in the normal operation mode as well as the electric motor 16 so as to satisfy the required drive force. In other words, the traveling mode is switched to the engine traveling mode (see FIG. 7(d) to (f)).

—Effects—

As described above, according to this embodiment, when the required drive force is below the switch value, the switching possibility that the required drive force will exceed the switch value is estimated. When the estimated switching possibility is above the predetermined level, in other words, when the switching possibility is relatively high, the engine 11 is operated so that the temperature of the catalyst 23 becomes the first temperature which is relatively high, and therefore, when the required drive force exceeds the switch value and the engine 11 is started, the emission degradation can be suppressed. On the other hand, when the estimated switching possibility is below the predetermined level, in other words, when the switching possibility is relatively low, the engine 11 is operated so that the temperature of the catalyst 23 becomes the second temperature which is relatively low, and therefore, a frequency of operating the engine 11 to maintain the activated state of the catalyst 23 can be reduced. Thus, the unnecessary increase in consumption amount of the fuel and the fuel consumption degradation can further be suppressed.

Additionally, the first temperature is set higher than the activating temperature of the catalyst 23. Therefore, when the estimated switching possibility is above the predetermined level, in other words, when the switching possibility is relatively high, the engine 11 is operated so that the temperature of the catalyst 23 becomes higher than the activating temperature of the catalyst 23. Thus, the emission degradation when the required drive force increases above the switch value and the engine 11 is started can further be suppressed.

Additionally, the second temperature is set lower than the activating temperature of the catalyst 23. Therefore, when the estimated switching possibility is below the predetermined level, in other words, when the switching possibility is relatively low, the engine 11 is operated so that the temperature of the catalyst 23 becomes lower than the activating temperature of the catalyst 23. Thus, the unnecessary increase in consumption amount of the fuel and the fuel consumption degradation can further be suppressed.

Moreover, the second temperature is set lower as the estimated switching possibility is lower. Therefore, when the estimated switching possibility is below the predetermined level, the engine 11 is operated so that temperature of the catalyst 23 becomes relatively high when the switching possibility is relatively high, and on the other hand, the engine 11 is operated so that temperature of the catalyst 23 becomes relatively low when the switching possibility is relatively low. Thus, the degradation in the emission and fuel consumption can further be suppressed.

Furthermore, when the estimated switching possibility is below the predetermined level and the required drive force exceeds the normal upper limit drive force of the electric motor 16, the engine 11 is operated in the activation facilitating mode in which the activation of the catalyst 23 can be facilitated, and the electric motor 16 is operated in the high output mode in which the drive force is higher than the normal upper limit drive force. Therefore, when the temperature of the catalyst 23 is still below the activating temperature and the engine 11 is operated, the required drive force can be satisfied by the drive force of the electric motor 16 and the catalyst 23 can be activated rapidly. Here, the engine 11 can be operated at a low load and, thus, it is advantageous in suppressing the emission degradation and rapidly warming up the engine 11.

Second Embodiment

In the first embodiment, the lower limit value of the second temperature is set in advance, and may suitably be set, for example, to the room temperature. However, in this embodiment, the lower limit second temperature is a temperature such that when the catalyst 23 is at the lower limit second temperature, the temperature of the catalyst 23 becomes the activating temperature by operating the engine 11 in the activation facilitating mode and the electric motor 16 in the high output mode, and the lower limit second temperature may be set lower as the temperature of the electric motor 16 is lower, in other words, the performance (i.e., instantaneous output) of the electric motor 16 is higher when the vehicle power source is switched from the OFF state to the ON state (i.e., when the ignition of the engine is switched from off to on).

Figure 8:
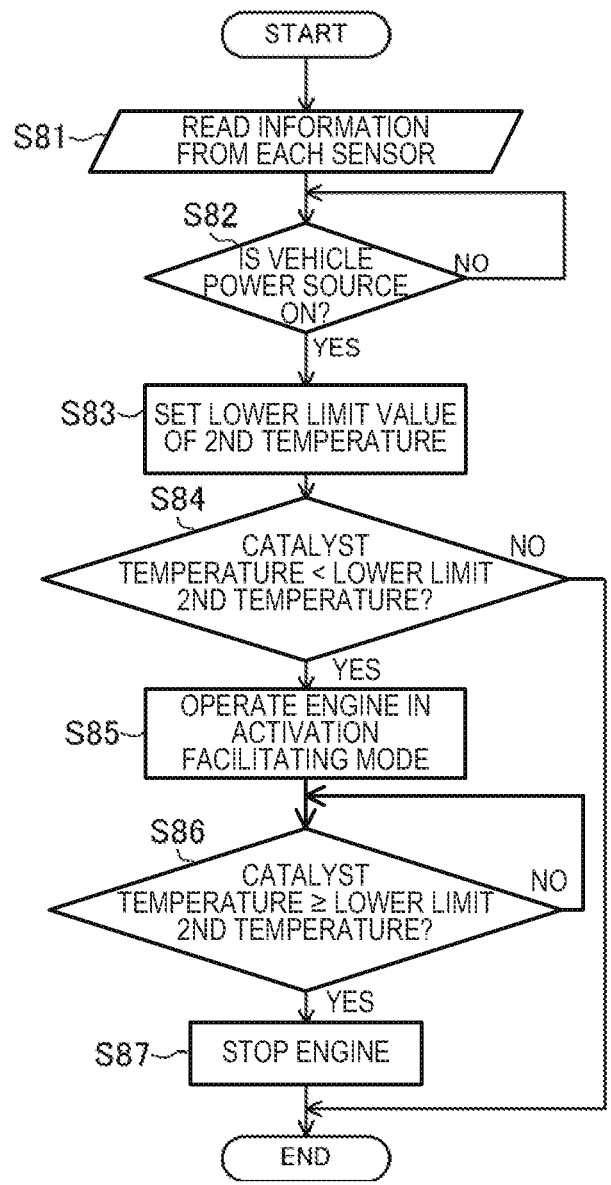
FIG. 8 is a flowchart relating to the engine control performed by the controller when a vehicle power source is switched to an ON state.

FIG. 8 is a flowchart relating to the control of the engine 11 performed by the control device CR when the vehicle power source is switched from the OFF state to the ON state. First, at Step S81 after the control starts, the controller 3 reads the information from the sensors 31 to 38. At the following Step S82, it is determined whether the vehicle power source is in the ON state. If the result of the determination at Step S82 is YES, the control shifts to Step S83. On the other hand, if the result of the determination at Step S82 is NO, the control returns back to Step S82.

At Step S83, the lower limit value of the second temperature is set based on the temperature of the electric motor 16. At the following Step S84, it is determined whether the catalyst temperature is below the set lower limit second temperature. If the result of the determination at Step S84 is YES, the control shifts to Step S85. On the other hand, if the result of the determination at Step S84 is NO, the control ends.

At Step S85, the engine 11 is operated at a low load (including no load) and the ignition timing is significantly retarded. Such an operation mode of the engine 11 increases the exhaust gas temperature and facilitates the activation of the catalyst 23 (i.e., the activation facilitating mode). At the following Step S86, it is determined whether the catalyst temperature is above the lower limit second temperature. If the result of the determination at Step S86 is YES, the control shifts to Step S87. On the other hand, if the result of the determination at Step S86 is NO, the control returns back to Step S86.

At Step S87, the engine 11 is stopped.

After the control device CR performs the control of the engine 11 when the vehicle power source is switched to the ON state as described above, the control of the engine 11 and the electric motor 16 shown in FIG. 5 is performed.

The configuration of this embodiment is similar to that of the first embodiment regarding parts other than that described above.

—Effects—

As described above, according to this embodiment, the effects similar to the first embodiment can be obtained.

Additionally, the lower limit second temperature is set to the temperature such that when the catalyst 23 is at the lower limit second temperature, the temperature of the catalyst 23 becomes the activating temperature by operating the engine 11 in the activation facilitating mode and the electric motor 16 in the high output mode. Thus, when the required drive force exceeds the switch value and the engine 11 is started, the emission degradation can further be suppressed.

Moreover, the lower limit second temperature is set lower as the temperature of the electric motor 16 is lower, in other words, the performance (i.e., instantaneous output) of the electric motor 16 is higher when the vehicle power source is switched from the OFF state to the ON state. Thus, the lower limit second temperature can be suitable for the performance of the electric motor 16.

Furthermore, the engine 11 is operated so that the temperature of the catalyst 23 becomes the lower limit second temperature when the vehicle power source is switched from the OFF state to the ON state, the lower limit second temperature being a temperature from which the temperature of the catalyst 23 becomes the activating temperature by operating the engine 11 in the activation facilitating mode and the electric motor 16 in the high output mode. Thus, the emission degradation can be suppressed when the hybrid automobile is started and the engine 11 is started because the required drive force is increased above the switch value.

Other Embodiments

Note that, the configuration of the hybrid automobile is not limited to the configuration described above, but various configurations may be adopted. For example, in the configuration shown in FIG. 1, the electric motor 16 is arranged downstream of the gear transmission 12 in the drive force transmitting direction; however, the electric motor 16 may be arranged upstream of the gear transmission 12 in the drive force transmitting direction so that the output of the electric motor is outputted to the drive wheel 14 via the gear transmission 12.

Alternatively, the electric motor 16 may include at least two electric motors to be able to apply the drive force to each of the left and right drive wheels 14 independently, instead of dividing the drive force of the single electric motor to the left and right drive wheels 14 via the differential gear 13 as described above. In this case, an in-wheel motor may be adopted.

Alternatively, the drive force of the electric motor 16 is not limited to be applied to the front wheels, but to rear wheels as well. Similarly, the drive force of the engine 11 is also not limited to be applied to the front wheels, but to rear wheels as well. Here, the wheels to which the drive force of the electric motor 16 is applied and the wheels to which the drive force of the engine 11 is applied may be the same as shown in FIG. 1 or different (e.g., the drive force of the engine 11 is applied to the front wheels and the drive force of the electric motor 16 is applied to the rear wheels, or the opposite of this). For example, when the drive force of the electric motor 16 is applied to the rear wheels, the configuration of the electric motor 16 is not limited such that it is coupled to a driveshaft of the rear wheels indirectly but may also be that the electric motor 16 is coupled in the middle of a driveshaft directly.

The powertrain PT may adopt a belt-type continuously variable transmission, alternative to the gear-type multistage automatic transmission.

A compression ignition engine (diesel engine) may be adopted as the engine 11, alternative to the spark-ignition engine. In this case, in order to operate the compression ignition engine in the activation facilitating mode, a combustion period may be retarded by, for example, changing (retarding) the ignition timing, so as to increase the exhaust gas temperature.

In addition, the control of the engine 11 and the electric motor 16 disclosed herein is not limited to the CD mode; however, such mode that limits the operation of the engine 11 is more effective.

Unless deviating from the spirit and scope of the present invention, the components of the respective embodiments may be arbitrary combined.

As described above, the method and device for controlling the hybrid automobile according to the present invention is applicable to, for example, an application that requires suppressing the degradation of the emission and fuel consumption.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

11 Engine
14 Drive Wheel (Wheel)
16 Electric Motor
22 Exhaust Passage
23 Three-way Catalyst
3 Controller

The invention claimed is:

1. A method of controlling a hybrid automobile including a motor and an engine for outputting drive forces to wheels, and a catalyst arranged in an exhaust passage of the engine, wherein only a drive force of the motor is outputted to the wheels by stopping the engine while operating the motor when a required drive force is below a predetermined switch value, and on the other hand, at least a drive force of the engine is outputted to the wheels by operating at least the engine when the required drive force is above the switch value, the method comprising:
estimating, when the required drive force is below the switch value, a switching possibility that the required drive force will increase above the switch value;
operating the engine so that a temperature of the catalyst becomes a first temperature when the estimated switching possibility is above a predetermined level; and
operating the engine so that the temperature of the catalyst becomes a second temperature lower than the first temperature when the estimated switching possibility is below the predetermined level.

2. The method of claim 1, wherein the first temperature is set higher than an activating temperature of the catalyst.

3. The method of claim 2, wherein the second temperature is set lower than the activating temperature of the catalyst.

4. The method of claim 3, wherein the second temperature is set lower as the estimated switching possibility is lower.

5. The method of claim 4, wherein the switch value corresponds to a normal upper limit drive force of the motor, and the method further comprising, when the estimated switching possibility is below the predetermined level and the required drive force exceeds the normal upper limit drive force, operating the engine in an activation facilitating mode where an activation of the catalyst is able to be facilitated, and operating the motor in a high output mode where the drive force of the motor is higher than the normal upper limit drive force.

6. The method of claim 5, wherein a lower limit value of the second temperature is set such that when the temperature of the catalyst is at the lower limit second temperature, the engine is operated in the activation facilitating mode and the motor is operated in the high output mode to bring the temperature of the catalyst to an activating temperature.

7. The method of claim 6, wherein the lower limit second temperature is set lower as a temperature of the motor is lower when a vehicle power source is switched from an OFF state to an ON state.

8. The method of claim 7, further comprising operating the engine so that the temperature of the catalyst becomes the lower limit second temperature when the vehicle power source is switched from the OFF state to the ON state.

9. The method of claim 1, wherein the second temperature is set lower than the activating temperature of the catalyst.

10. The method of claim 9, wherein the second temperature is set lower as the estimated switching possibility is lower.

11. The method of claim 10, wherein the switch value corresponds to a normal upper limit drive force of the motor, and the method further comprising, when the estimated switching possibility is below the predetermined level and the required drive force exceeds the normal upper limit drive force, operating the engine in an activation facilitating mode where an activation of the catalyst is able to be facilitated, and operating the motor in a high output mode where the drive force of the motor is higher than the normal upper limit drive force.

12. The method of claim 11, wherein a lower limit value of the second temperature is set such that when the temperature of the catalyst is at the lower limit second temperature, the engine is operated in the activation facilitating mode and the motor is operated in the high output mode to bring the temperature of the catalyst to an activating temperature.

13. The method of claim 12, wherein the lower limit second temperature is set lower as a temperature of the motor is lower when a vehicle power source is switched from an OFF state to an ON state.

14. The method of claim 13, further comprising operating the engine so that the temperature of the catalyst becomes the lower limit second temperature when the vehicle power source is switched from the OFF state to the ON state.

15. The method of claim 1, wherein the second temperature is set lower as the estimated switching possibility is lower.

16. The method of claim 15, wherein the switch value corresponds to a normal upper limit drive force of the motor, and the method further comprising, when the estimated switching possibility is below the predetermined level and the required drive force exceeds the normal upper limit drive force, operating the engine in an activation facilitating mode where an activation of the catalyst is able to be facilitated, and operating the motor in a high output mode where the drive force of the motor is higher than the normal upper limit drive force.

17. The method of claim 16, wherein a lower limit value of the second temperature is set such that when the temperature of the catalyst is at the lower limit second temperature, the engine is operated in the activation facilitating mode and the motor is operated in the high output mode to bring the temperature of the catalyst to an activating temperature.

18. The method of claim 1, wherein the switch value corresponds to a normal upper limit drive force of the motor, and the method further comprising, when the estimated switching possibility is below the predetermined level and the required drive force exceeds the normal upper limit drive force, operating the engine in an activation facilitating mode where an activation of the catalyst is able to be facilitated, and operating the motor in a high output mode where the drive force of the motor is higher than the normal upper limit drive force.

19. The method of claim 18, wherein a lower limit value of the second temperature is set such that when the temperature of the catalyst is at the lower limit second temperature, the engine is operated in the activation facilitating mode and the motor is operated in the high output mode to bring the temperature of the catalyst to an activating temperature.

20. A control device of a hybrid automobile, comprising:
a motor and an engine for outputting drive forces to wheels;
a catalyst arranged in an exhaust passage of the engine; and
a controller for outputting only a drive force of the motor to the wheels by stopping the engine while operating the motor when a required drive force is below a predetermined switch value, and on the other hand, outputting at least a drive force of the engine to the wheels by operating at least the engine when the required drive force is above the switch value,
wherein the controller estimates, when the required drive force is below the switch value, a switching possibility that the required drive force will increase above the switch value, and the controller operates the engine so that a temperature of the catalyst becomes a first temperature when the estimated switch possibility is above a predetermined level, and on the other hand, the controller operates the engine so that the temperature of the catalyst becomes a second temperature lower than the first temperature when the estimated switch possibility is below the predetermined level.

* * * * *